United States Patent
Kopp et al.

(10) Patent No.: US 10,344,888 B2
(45) Date of Patent: *Jul. 9, 2019

(54) TWO-STAGE CLOSED CENTER ELECTRO-HYDRAULIC VALVE

(71) Applicant: Moog Inc., East Aurora, NY (US)

(72) Inventors: John Kopp, West Seneca, NY (US); Christopher Mazurkiewicz, West Seneca, NY (US)

(73) Assignee: Moog Inc., East Aurora, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/518,349

(22) PCT Filed: Sep. 30, 2015

(86) PCT No.: PCT/US2015/053225
§ 371 (c)(1),
(2) Date: Apr. 11, 2017

(87) PCT Pub. No.: WO2016/054211
PCT Pub. Date: Apr. 7, 2016

(65) Prior Publication Data
US 2017/0248251 A1    Aug. 31, 2017

Related U.S. Application Data

(60) Provisional application No. 62/058,490, filed on Oct. 1, 2014.

(51) Int. Cl.
*F16K 31/42* (2006.01)
*F15B 13/044* (2006.01)
(Continued)

(52) U.S. Cl.
CPC .......... *F16K 31/426* (2013.01); *F15B 13/043* (2013.01); *F15B 13/0435* (2013.01);
(Continued)

(58) Field of Classification Search
CPC .... F16K 31/426; F16K 31/047; F16K 31/086; Y10T 137/86517; F15B 13/043
See application file for complete search history.

(56) References Cited

U.S. PATENT DOCUMENTS

| 3,228,423 A | 1/1966 | Moog |
| 3,747,570 A | 7/1973 | Versari et al. |

(Continued)

FOREIGN PATENT DOCUMENTS

| BE | 551 168 A | 10/1956 |
| EP | 0853731 B1 | 12/2000 |

(Continued)

OTHER PUBLICATIONS

International Search Report and Written Opinion of the International Searching Authority (European Patent Office) (10 pages) dated Dec. 4, 2015.

(Continued)

*Primary Examiner* — Eric Keasel
*Assistant Examiner* — Kevin R Barss
(74) *Attorney, Agent, or Firm* — Harter Secrest & Emery LLP (57) ABSTRACT

A servovalve (15) comprising a motor (16), a motor bias mechanism (20), a first stage valve member (22) adapted to be moved from a first position to a first off-null position, a second stage member (29) adapted to be moved from a first position to a second position with movement of the first valve member (22), a transfer link (34) acting between the first (22) and second (29) valve members, an eccentric drive member (35) acting between the motor (16) and the transfer link (34), the transfer link (34) and drive member (35) configured such that selective movement of the motor (16) causes the transfer link (34) to move the first valve member (22), movement of the first valve member (22) causes the (Continued)

second valve member (29) to move, and movement of the second valve member (29) causes the transfer link (34) to move the first valve member (22) from the first off-null position back to the null position.

14 Claims, 5 Drawing Sheets

(51) Int. Cl.
  *F16K 31/04* (2006.01)
  *F16K 31/08* (2006.01)
  *F15B 13/043* (2006.01)
(52) U.S. Cl.
  CPC ........ *F15B 13/0444* (2013.01); *F16K 31/047* (2013.01); *F16K 31/082* (2013.01)

(56) References Cited

U.S. PATENT DOCUMENTS

| | | |
|---|---|---|
| 4,641,812 A | 2/1987 | Vanderlaan et al. |
| 4,951,549 A | 8/1990 | Olsen et al. |
| 5,135,030 A | 8/1992 | Schoen |
| 5,146,126 A | 9/1992 | Hutchins |
| 5,263,680 A | 11/1993 | Laux |
| 6,039,077 A | 3/2000 | Schulze |
| 6,334,604 B1 | 1/2002 | Roth |
| 2006/0082237 A1* | 4/2006 | Kerlin .................... H02K 1/145 310/166 |
| 2017/0254431 A1* | 9/2017 | Kopp ...................... F16K 11/07 |

FOREIGN PATENT DOCUMENTS

| | | |
|---|---|---|
| EP | 1295041 B1 | 10/2004 |
| JP | S5874602 U | 5/1983 |
| JP | S63203904 A | 8/1988 |

OTHER PUBLICATIONS

The International Search Report (ISR) and Written Opinion of the searching authority for PCT Application Serial No. PCT/US2017/019954; completed Jun. 13, 2017.

* cited by examiner

TWO-STAGE CLOSED CENTER ELECTRO-HYDRAULIC VALVE

TECHNICAL FIELD

The present invention relates generally to the field of electrohydraulic servovalves and, more particularly, to an improved two-stage electrohydraulic servovalve.

BACKGROUND ART

Electrohydraulic servovalves are known. These may be thought of as having either a single stage or as having multiple stages. In both forms, a valve spool is slidably mounted within a cylinder for controlled movement there along. When the valve spool is in a centered or null position within the cylinder, various lands on the valve spool cover ports that communicate with the control outlets to prevent flow through the valve. The direction and magnitude of spool movement off-null controls the flows through the valve. Various forms of single-stage servovalves are representatively shown and described in U.S. Pat. Nos. 4,951,549, 5,263,680, 4,641,812, and 5,146,126, the aggregate disclosures of which are hereby incorporated by reference.

A single-stage or direct-drive valve generally has a motor or some other mechanism that directly engages the valve spool, and which selectively causes the spool to move off-null. A multiple-stage valve may have a pilot stage that controls movement of a valve spool in a second stage. The pilot stage may be an electrical section, and the second stage may be an hydraulic section. One example of a two-stage electrohydraulic servovalve is shown and described in U.S. Pat. No. 3,228,423, the aggregate disclosure of which is hereby incorporated by reference.

BRIEF SUMMARY OF THE INVENTION

Figure 4:
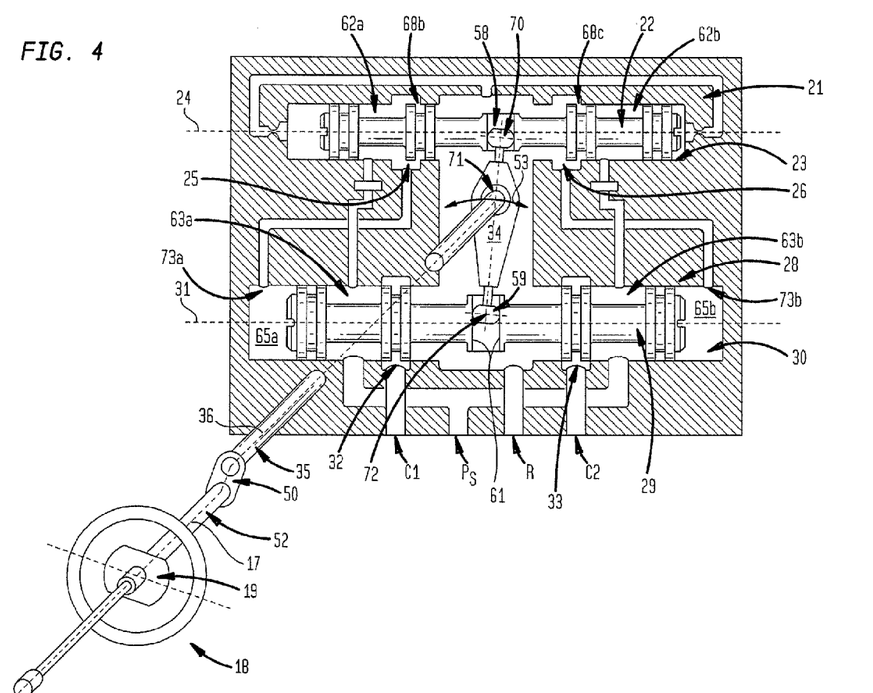
FIG. 4 is a schematic view of the valve shown in FIG. 1, in which the rotor has been rotated about 10° in a clockwise direction from the position shown in FIG. 1, such movement producing concomitant movement through the drive member and the transfer link of the first stage valve spool off-null.
Figure 5:
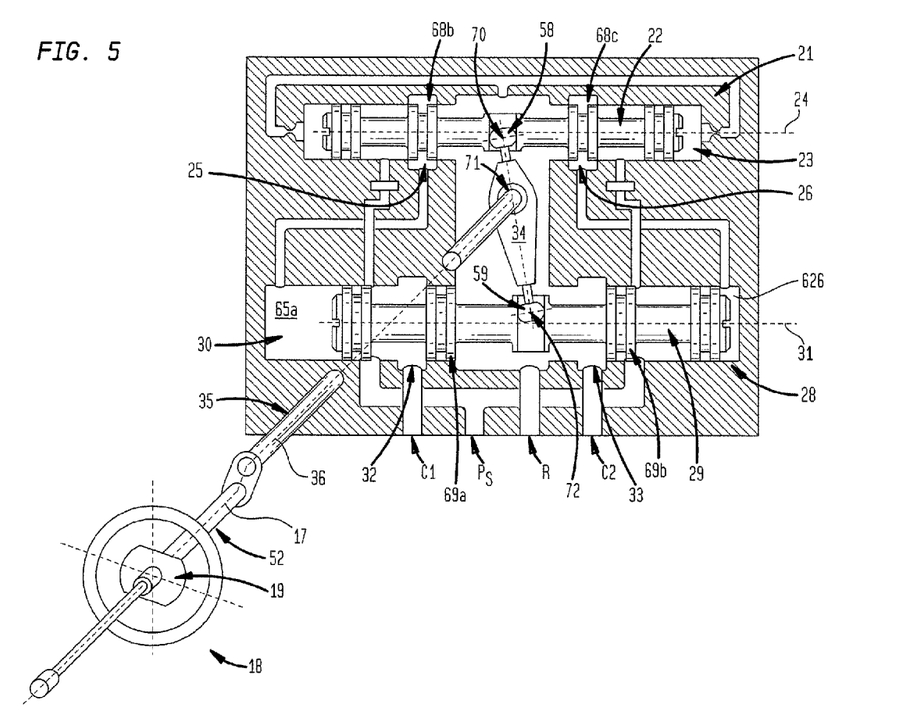
FIG. 5 is a schematic view of the valve shown in FIG. 1, in which the second stage valve has moved to the desired second position, such movement producing through the transfer link concomitant movement of the first stage valve spool back to the null position shown in FIG. 1.

With parenthetical reference to the corresponding parts, portions or surfaces of the disclosed embodiment, merely for purposes of illustration and not by way of limitation, an improved two stage electro-hydraulic servovalve (15) is provided comprising a motor (16) having a stator (18) and a rotor (19) having a rotor null position (FIG. 1) and configured and arranged to rotate about a motor axis (17) under the effect of a magnetic field generated by the stator; a bias mechanism (20) configured and arranged to bias the rotor to the rotor null position; a first stage valve (21) having a first valve member (22) movably mounted in a first chamber (23) along a first valve axis (24), and adapted to be moved from a first null position (FIG. 1) to a first off-null position (FIG. 4) along the first chamber axis to selectively meter fluid flow from at least one port (25, 26) defined between the first valve member and the first chamber; a second stage valve (28) in fluid communication with the port of the first valve and having a second valve member (29) movably mounted in a second chamber (30) along a second valve axis (31), and adapted to be moved from a first position (FIG. 1) to a second position (FIG. 5) along the second valve axis as a function of movement of the first valve member, to selectively meter the flow of fluid from at least one port (32, 33) between the second valve member and the second chamber; the first stage valve and the second stage valve configured and arranged such that the second stage valve member is at a pressure equilibrium and does not move when the first stage valve member is in the null position; a transfer link (34) acting between the first valve member and the second valve member; an eccentric drive member (35) acting between the rotor and the transfer link and having a first eccentric axis (36) that is off-set a distance (51) from the motor axis and arranged such that selective rotation of the rotor about the motor axis causes the transfer link to move; the transfer link and the drive member configured and arranged such that selective movement of the rotor from the rotor null position to a second rotor position (FIG. 4) causes the drive member and the transfer link to move the first valve member from the first null position to the first off-null position (FIG. 4); movement of the first valve member from the first null position to the first off-null position causes the second valve member to move from the first position to the second position (FIG. 5); and the movement of the second valve member to the second position causes the transfer link to move the first valve member from the first off-null position back to the null position (FIG. 5).

The transfer link may comprises a first end portion (58) engaging the first valve member at a first connection (70); the transfer link may comprises a second end portion (59) engaging the second valve member at a second connection (72); and the eccentric drive member and the transfer link be coupled at a third connection (71). The transfer link and the eccentric drive member may be rotationally coupled at the third connection. The transfer link may be configured and arranged to move the first valve member from the first null position to the first off-null position with selective rotation about the second connection. The transfer link may be configured and arranged to move the first valve member from the first off-null position back to the null position with selective rotation about the third connection. The transfer link may be configured and arranged to move the first valve member from the first off-null position back to the null position with selective rotation about the first eccentric axis. The first eccentric axis (36) may be aligned with the third connection (71). The first stage valve may comprise a second port (26), the second chamber of the second stage valve may comprise a first sub-chamber (65a) and a second sub-chamber (65b), the port my be flow connected to the first sub-chamber and the second port may be flow connected to the second sub-chamber, and the second valve member may be adapted to be moved from the first position to the second position along the second valve axis as a function of a hydraulic pressure differential between the first sub-chamber and the second sub-chamber. The bias mechanism may comprise a torsional spring (46). The rotor may consists essentially of a magnet. The stator may comprise a circular ring-like core (43) and windings about the core (44, 45) orientated in opposite directions around the core. The first chamber and the second chamber may each comprise a cylinder and the first stage and the second stage valve members may each comprise a valve spool. The first stage valve member may comprise a slot (75) bounded by substantially-parallel walls (60) and the transfer link may comprises a rounded marginal end portion (58) engaging the slot walls. The second valve member may comprise a slot (76) bounded by substantially-parallel walls (61) and the transfer link may comprise a second rounded marginal end portion (59) engaging with the slot walls. The servovalve may comprise at least one bearing (56) acting between the drive member and the transfer link.

DESCRIPTION OF THE PREFERRED EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., crosshatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, an improved two-stage electro-hydraulic valve is provided, an embodiment of which is generally indicated at 15. Valve 15 is shown as broadly including motor 16, bias mechanism 20, drive member 35, transfer link 34, first stage valve 21, and second stage valve 28.

Figure 2:
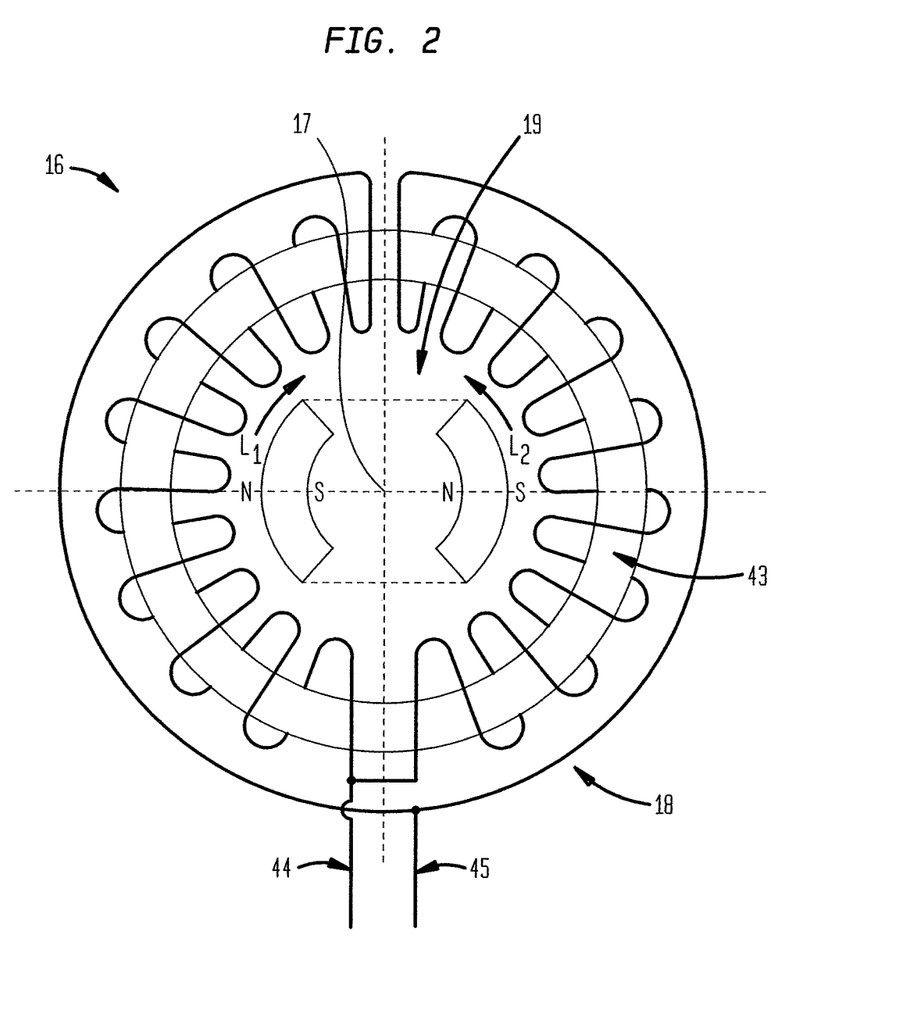
FIG. 2 is an enlarged schematic view of the motor shown in FIG. 1.

In this embodiment, motor 16 is a rotary brushless DC toroid motor having a single pole and phase and limited angular displacement. As shown, motor 16 includes stator 18 and rotor 19. As shown in FIG. 2, in this embodiment stator 18 is a toroid and has a circular ring-shaped core 43 around which coils 44 and 45 are wound. Coil 44 is wound clockwise half-way around core 43, from the six o'clock position to the twelve o'clock position, and is then looped, not wound, back to the six o'clock position, while coil 45 is wound counterclockwise half-way around core 43, from the six o'clock position to the twelve o'clock position, and is then looped, not wound, back to the six o'clock position. In addition, coils 44 and 45 are wound around core 43 in opposite directions relative to the center circular axis 17 of core 43. Coil 44 is wrapped in one direction and, depending upon the rotation and the magnetic field, current will produce an electromagnetic force in one direction. By bringing the end of coil 44 back around and connecting it over to coil 45, which is wrapped around core 43 in the opposite direction, torque summing from both halves is provided but the inductance is almost cancelled. With the wiring shown, having a path around one half of the circumference of metallic soft magnetic core 43, and a second path around the other half of the circumference of core 43, wrapping around and starting on the opposite end and then coming back, torque summation from current and electromagnetic force is provided but inductance is canceled. And by joining the wires as shown, a single coil is provided. However, to impart redundancy, wires 44 and 45 may be two-stranded wires or twisted pairs. If power from a controller or a computer is lost in one wire, or if one of the wires breaks, the other wire is available to do the same exact thing. Electrically this results in a very fast device.

By wrapping the coils 44 and 45 around ring-like core 43 to provide a toroid, the torque density as compared to a stator toothed design is less. However, there is also significantly less cogging or torque ripple. In addition, by wrapping wires 44 and 45 around soft magnetic core 43 and changing current in both directions, depending upon the frequency or speed of current that is flowing through the wire, eddy current losses are produced that act like little dampers or resistance to motion as a function of speed, or increased torque resistance as a function of speed. The typical manner of handling that is to form stator core 43 from laminates. A core having multiple laminates and insulating material there between can be used to reduce or eliminate such dampening or eddy current loss. However, in this embodiment, some dampening is desired. By designing stator core 43 with a certain number of laminates, such as two halves, three-thirds, four-fourths or more, the amount of dampening can be selected to provide a stable high performance valve.

In this embodiment, rotor 19 consists essentially of a permanent magnet. Thus, other than grounding spring 46 and output shaft 52, the magnet comprises the entire rotor. The power coming out of the magnet is more substantial and, because of the shape of the magnet, the arc angle of the magnet can be larger without causing manufacturing complications.

As shown, bias mechanism 20 acts on rotor 19. In this embodiment, bias mechanism 20 comprises torsional spring 46 and clamp 48 set to bias rotor 19 back to a desired null or grounded position. Mechanism 20 not only acts like a spring to bias rotor 19, it also supports or holds rotor 19 in position relative to stator 18. Rather than rotating about axis 17 on bearings, rotor 19 is suspended by spring 46 and acts as a flexural straining element. This eliminates parts like bearings and friction elements. As shown, spring 46 is part of rotor 19 and extends to the top of the cavity of upper part 41 of housing 38, where it is grounded. A single jewel bearing 49 at the bottom of rotor 19 is used to remove side motion. To reference rotor 19 and bias mechanism 20 to zero or ground, so that motor 16 and valves 21 and 28 are grounded and referenced to housing 38, clamp 48 can be adjusted or rotated relative to housing 38 to get the position desired to reference the null of motor 16 relative to the output flow of second stage valve 28. Clamp 48 can be rotationally adjusted, and thus rotor 19 rotationally adjusted relative to stator 18, to provide a desired motor null position in which torsion spring 46 is not flexed or strained. Thus, the null position of rotor 19 may be adjusted as desired by the user by resetting clamp 48 to the desired rotational position without having to access motor 16. While a torsional spring is shown and described, other bias mechanisms may be used as alternatives.

As shown, output shaft 52 of rotor 19 rotates about motor axis 17 relative to housing 38. In this embodiment, drive member 35 is an eccentric cylindrical shaft elongated about center axis 36. Eccentric drive shaft 35 is rotationally coupled to rotor 19 by offset link 50, such that motor axis 17 is offset a distance 51 from center longitudinal axis 36 of drive shaft 35. Thus, output shaft 52 of rotor 19 is linked to eccentric drive 35 such that longitudinal axis 36 of eccentric drive shaft 35 is set off from rotational axis 17 of rotor 19. When rotor 19 rotates about axis 17, that rotation is transferred to eccentric drive shaft 35 and causes distal end 54 of shaft 35 to move in an arc path 53. Such motion is transferred to transfer link 34 at connection joint 71.

Transfer link 34 extends generally transversely between spool 22 of valve 21 and spool 29 of valve 28. As shown, transfer link 34 comprises first end 58 that engages slot or seat 75 in spool 22 at connection joint 70, second end 59 that engages slot or seat 76 in spool 29 at connection joint 72, and recess or opening 55 between ends 58 and 59 sized and configured to receive end pin 54 of eccentric drive shaft 35 to form connection joint 71. As shown, end 58 is a rounded ball-like end portion that is received between two facing parallel planar walls, severally indicated at 60, of notch or slot 75 in valve spool 22. Similarly, end 59 is a rounded ball-like end portion that is received between two facing parallel planar walls, severally indicated at 61, of notch or slot 76 in valve spool 29. This design is such that transfer link 34 takes out possible misalignment between spools 22 and 28 and rotor axis 17. Since ends 58 and 59 of transfer link 34 are generally spherical and machined into link 34, they allow transfer link 34 to angularly sweep and still drive valve spools 22 and 28, but they also allow the system to dynamically adjust for misalignment and thereby reduce the potential for binding, excessive friction and jamming. Link 34 allows the spools and drive shaft to seek their defined positions such that all of the members are mechanically connected but not binding.

End pin 54 of eccentric drive 35 fits within hole 55 in transfer link 34. Annular earing 56 between pin 54 of drive 35 and hole 55 of transfer link 34 allows for some relative rotational movement at connection joint 71. However, movement of pin 54 of drive 35 in arc 53 causes transfer link 34 to move in what appears to be a linear fashion, thereby moving first spool 22 along axis 24.

Figure 3:
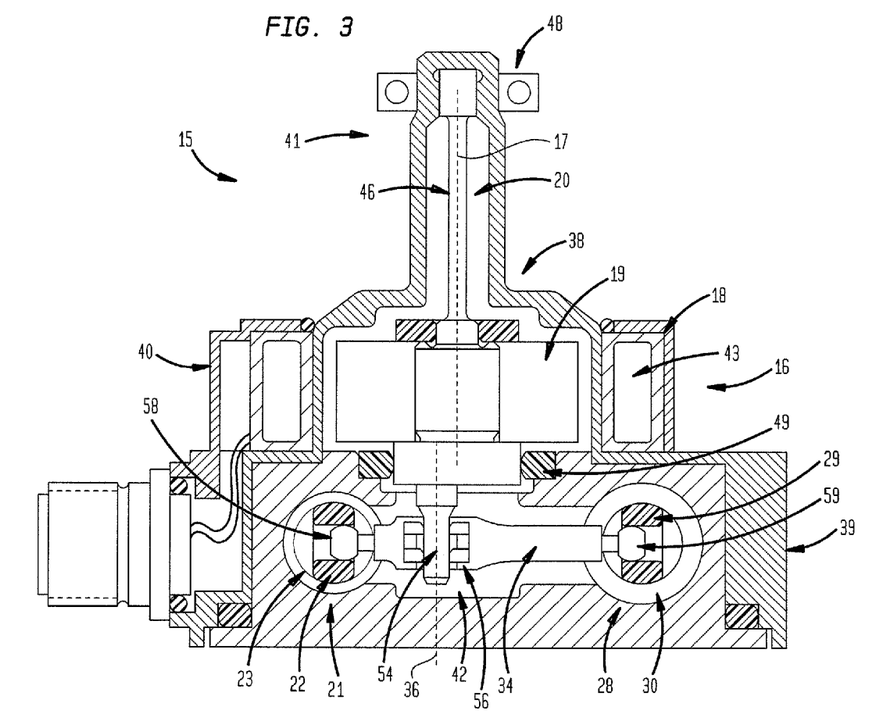
FIG. 3 is a vertical cross-sectional view of the valve shown in FIG. 1.

As shown in FIG. 3, valve 15 is an assembled body, generally indicated at 38. Body 38 includes lower or base part 39 housing first stage valve 21 and second stage valve 28, intermediate or central part 40 housing motor 16, and upper or top part 41 housing bias mechanism 20. Thus, inside body 38 of valve 15 are two spools 22 and 29 that sit in chambers 23 and 30, respectively, machined into bushings that are pressed into body 38.

Figure 1:
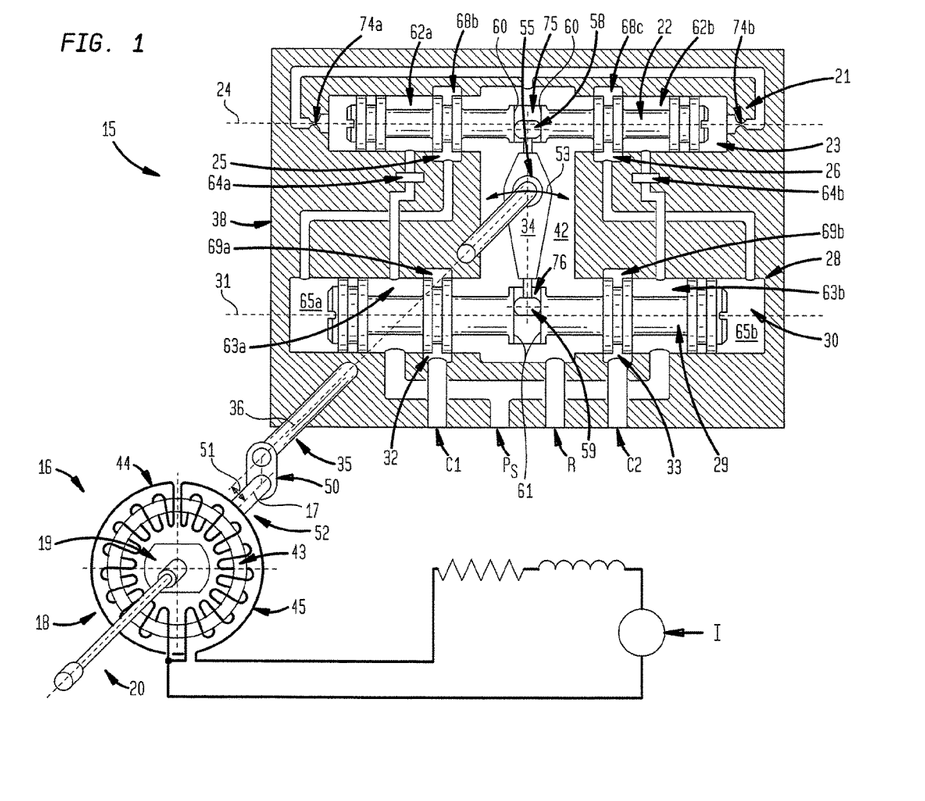
FIG. 1 is a schematic view of an embodiment of an improved two-stage electro-hydraulic valve, in which the first stage valve is in a centered or null position relative to the cylinder and the second stage valve is in a first position that prevents flow through the second stage valve.

Four ports come into body 38. As shown in FIGS. 1 and 3, base 39 of valve 15 has operative connections to supply pressure Ps, fluid return R and two control ports, C1, C2, respectively. Hence, because there are four fluid connections, this valve is a four-way servo valve. However, it should be clearly understood that the embodiments are not limited to four-way valves, but could be readily adapted to a three-way valve, or some other form, as desired. Control ports C1 and C2 are the output of second stage valve 28. Supply port Ps brings in high pressure oil, water or other fluid or gas and connects to both supply or pressure chambers 63a and 63b of second stage valve 28 as well as pressure chambers 62a and 62b of first stage valve 21. Because first valve 21 is a pilot stage and has slots that are very small, filters 64a and 64b are provided in the supply lines to pressure chambers 62a and 62b, respectively, to trap and contain any particles of contamination and prevent valve spool 22 from jamming. The output flow from ports 25 and 26 of first stage valve 21 connect to the respective end chambers 65a and 65b of chamber 30 of second stage valve 28.

Base 39 has two horizontal through-bores which form chambers 23 and 30 to receive and accommodate sliding movement of valve members 22 and 29 of first stage valve 21 and second stage valve 28, respectively. In this embodiment, chambers 23 and 30 are cylindrical. However, such through-bores may have non-circular cross sections, causing the chambers to be a non-cylindrical shape, such as a rectangular prism, or other similar shape. In this embodiment valve members 22 and 29 are cylindrical valve spools. However, the valve spools may have alternative shapes, such as a rectangular prism forming a shear plate. Valve chambers 23 and 30 and spools 22 and 29 are elongated about axis 24 and 31, respectively, such that valve spool 22 moves linearly along axis 24 and valve spool 29 moves linearly along axis 31, which is parallel to axis 24. Both axis 24 and axis 31 are transverse to motor axis 17 and longitudinal axis 36 of eccentric drive shaft 35.

Base 39 also includes a horizontal through bore extending transversely between chambers 23 and 30 which forms chamber 42 to receive and accommodate movement of transfer link 34 acting between first stage spool 22 and second stage spool 29. Intermediate part 40 is adapted to face and engage base part 39 and houses motor 16. Upper part 41 is in the nature of a cover which protectively surrounds and covers mechanism 20.

As shown in FIGS. 1 and 3, valve spool 22 comprises a plurality of lands and grooves along its longitudinal extent in the usual manner, and is adapted to be selectively and controllably shifted by end 58 of transfer link 34 either leftwardly or rightwardly, as desired, within cylinder 23 from the null position along axis 24 shown in FIG. 1. In this null position, respective lands on valve spool 22 cover ports 25 and 26 communicating with chambers 65a and 65b, respectively, of cylinder 30 of second valve stage 28. As shown, in the null configuration of FIG. 1, hydraulic flow between hydraulic supply Ps and supply chamber 62a through port 25 of cylinder chamber 30 is blocked by lands 68b. Similarly, hydraulic supply Ps and supply chamber 62b through port 26 of cylinder chamber 30 is blocked by lands 68c. Hydraulic fluid in chambers 62a and 62b is prevented from flowing out by spool lands 68b and 68c, respectively. Thus, spool 22, and in turn spool 29, are constrained from moving due to pressure equilibrium.

As shown in FIGS. 1 and 3, valve spool 29 comprises a plurality of lands and grooves along its longitudinal extent in the usual manner, and is adapted to be selectively and controllably shifted by differential pressure between end chambers 65a and 65b either leftwardly or rightwardly, as desired, within cylinder 30 from the position along axis 31 shown in FIG. 1. In this position, respective lands on valve spool 29 cover ports 32 and 33, respectively, of control openings C1 and C2 to prevent flow through the valve.

Coil 44, 45 may be selectively energized by supplying it with a current of appropriate magnitude and plurality to cause rotor 19 to rotate about axis 17 in either a clockwise or counterclockwise direction. The direction of rotor movement is determined by the polarity of the supplied current. The magnitude of angular rotor movement is determined by the magnitude of the supplied current.

In FIG. 4, rotor 19 is shown as having just rotated about axis 17 approximately 10° in a clockwise direction from the rotary null position shown in FIG. 1. When rotor 19 rotates clockwise about axis 17, as shown in FIG. 4, such rotation causes pin 54 of eccentric drive shaft 35 to move to the right along arc 53. Because at this point spool 29 is constrained from movement due to equalized pressure at both its ends as described above, connection joint 72 between ball end 59 of link 34 and spool notch walls 61 of spool 29 momentarily acts as a fixed axis. Because of this and the eccentric offset described above, movement of pin 54 of eccentric drive shaft 35 to the right along arc 53 causes ball end 58 of transfer link 34 to move to the right. Thus, ball end 58 and connection joint 70 rotates clockwise relative to connection joint 72. As this occurs, ball end 58 causes valve spool 22 to move in one axial direction along axis 24 to the right within cylinder 23. As shown in FIG. 4, as valve spool 22 is moved off-null and to the right, spool lands 68b and 68c are no longer aligned on ports 25 and 26, respectively, which allows fluid to flow to or from ports 25 and 26, respectively, and in turn to and from ports 73a and 73b in chamber 30 to piston chambers 65a and 65b, respectively, of second stage valve 28. Such movement of spool 22 exposes port 25 to high supply pressure and exposes port 26 to low return pressure. This displaced condition of spool 22 enables fluid to flow into chamber 65a of second stage valve 28 from supply and to flow out of chamber 65b of second stage valve 28 to return, thus creating a pressure differential between one end of spool 29 and the other end of spool 29.

When this happens, since control ports 25 and 26 from first stage valve 21 are feeding the ends of spool 29 of second stage valve 28 as described above, spool 29 is moved in one axial direction along axis 31 to the right within cylinder 30. As shown in FIG. 5, as valve spool 29 is moved to the right, spool lands 69a and 69b are no longer aligned on ports 32 and 33, respectively, which allows fluid to flow to or from ports 32 and 33 and controls C1 and C2, respectively. Such movement of spool 29 exposes port 32 to high supply pressure Ps and exposes port 33 to low return pressure R.

The movement of spool 29 to the right also causes movement of transfer link 34. In particular, as shown in FIG. 5, because at this point end pin 54 of drive shaft 35 is held in position by motor 16, connection joint 71 between pin 54 and hole 55 in link 34 acts as a fixed axis. With movement of spool 29 to the right, ball end 59 and connection joint 72 moves counterclockwise about connection joint 71 and eccentric axis 36, causing transfer link 34 to rotate counter-clockwise about connection joint 71 and eccentric axis 36. Counter-clockwise rotation of transfer link 34 about axis 36 causes ball end 58 of transfer link 34 and connection joint 70 to move counterclockwise about connection joint 71 and eccentric axis 36 and to the left. Movement of ball end 58 to the left causes valve spool 22 to move to the left within cylinder 23 until first stage valve 21 returns to the null position. As shown in FIG. 5, as valve spool 22 is moved left, spool lands 68b and 68c realign over ports 25 and 26, respectively, which stops fluid flow from and ports 25 to end chamber 65a and from port 26 to end chamber 65b of chamber 30 of second stage valve 28. Spool 29 stops moving with the closing of ports 25 and 26 and the return of equilibrium pressure at both ends of spool 29. Thus, spool 29 cancels the motion of the held position of rotor 19 and eccentric drive pin 54 and rotates transfer link 34 about axis 36 until it reestablishes null of first stage spool 22 of first stage valve 21.

If the polarity of the supplied current were reversed, rotor 17 would rotate counterclockwise about axis 17, with such rotation causing pin 54 of eccentric drive shaft 36 to move to the left along arc 53, in turn causing ball end 58 of transfer link 34 to move to the left, thereby causing spool 22 to move left along axis 24 off null to displace spool 22 in the opposite direction relative to cylinder 23. Connection joints 70, 71 and 72 are said to be floating connections since their axis is not fixed relative to actuator body 38. Axes 17 is not floating.

Because rotor 19 is an inertial mass suspended on torsion spring 43, the frequency of rotor 19 is a potential issue, particularly if that frequency is in the middle of the operational frequency of valve 15. To address this, some dampening is provided. It is acceptable to have damping and slow the response because of the amplification between first stage valve 21 and second stage valve 28. Such dampening is provided in two places. As mentioned above, some dampening may be provided by controlling the number of laminations forming core 43. Second, as shown in FIG. 1, narrowing orifices 74a and 74b are provided at the end of the fluid connection between R and the end chambers of first stage chamber 23 to help squelch the motion of first stage spool 22. So if rotor 19 were to start resonating violently, first stage spool 22 would have to start moving with it because spool 22 and rotor 19 are connected via drive member 35 and transfer link 34 as described above. If this starts to happen, orifices 74a and 74b will start to impede the motion of first stage spool 22, making it look like a dynamic attenuator or spring.

Bias mechanism 20 is provided so that valve 15 will have a given rated flow at a rated current. Spring 46 is selected such that with the appropriate amount of rotational motion of rotor 19, spring 46 will deflect that same amount and produce the amount of counter torque equal to the rated current and torque constant of motor 16. So if the rated current is 35 milliamps and 10 degrees of rotation on rotor 19 is desired, spring 46 is selected accordingly. Thus for a given flow rate output there is a given current input to produce it.

Valve spool 29 arrives at a position or a command and mechanically conveys that it has arrived at that position. The position of second stage spool 29 is slaved to first staged spool 22 via transfer link 34 and the motion of transfer link 34 is slaved to the position of rotor 19 because of spring 46 and the current or torque constant of motor 16. So for a given amount of current, a certain amount of torque out of motor 16 produces motion into eccentric pin 54, which in turn produces a relative position of first stage spool 22, and second stage spool 29 is slaved to first stage spool 22 via transfer link 34.

Valve 15 provides a number of advantages. First, motor 16 does not have to be extremely large. Motor 16 only has to have enough power to move first stage spool 22, as first stage valve 21 moves second stage valve spool 29. Second, the first stage valve 21 has a smaller amount of motion but amplifies the motion of second stage valve 28 by having control flow coming from middle lands 68b and 68c to the ends 65a and 65b of spool 29. The slots of the larger second stage spool 29 are much wider so, with very small motion of first stage spool 22, extreme motion out of second stage spool 29 is achieved. Third, valve 15 results in reduced amounts of leakage. Fourth, the rotor is symmetrical and balanced. Because of the configuration of the spools, the motor and the rotor, acceleration via vibration or shock or some motion that applies an external force on valve 15 is less likely to move valve 15. Fifth, the manner in which rotor 19 is attached to body 38 makes it easy to null the electrical current because all that is needed is to move the stator clockwise or counter-clockwise until enough travel of the rotor to meet the desired amplitude is achieved. Sixth, stator 18 is piloted by the hydraulic chamber which surrounds the valve elements and so the motor is not in as precarious a position and subject to motion that will change the null. In this design the motor stator can even rotate a degree or two or be shifted and it will not change the null because of the constraints.

In the preferred embodiment, rotor 19 is designed to rotate only plus or minus 10 degrees about motor axis 17 off of the rotor null position. Most limited angle torque motors can go up to plus or minus 30 or 35 degrees and still have a linear function of torque and current. The reason this embodiment it is limited to only 10 degrees is it defines the stiffness of spring 46. The less stroke, the stiffer spring 46 becomes, which means the resonant frequency of first stage spool 22 increases. The optimum choice is to minimize the rotor angular amplitude as much as possible but still provide enough that backlash is eliminated.

Various additional changes and modifications may be made to the described embodiments. For example, the size, shape and configuration of the various parts are not deemed to be critical, except as may be incorporated in the appended claims. Nor are the materials of construction deemed to be critical. As previously indicated, the valve spools may be slidably mounted directly on the base, or may be slidably mounted within a bushing inserted into a through-bore provided on the base. In one embodiment, the head of ball end 58 and 59 is split, so that the rounded head portion consists of two portions that are biased away from one another so as to maintain frictionless rolling contact with the walls of the valve spool seat in which the rounded head is engaged. Alternative motor types may be used to cause the rotor to rotate relative to the body.

Therefore, while the presently preferred form of the improved two stage electrohydraulic valve has been shown and described, and several modifications thereof discussed, persons skilled in this art will readily appreciate that various additional changes and modifications may be made without departing from the scope of the invention, as defined and differentiated by the claims.

What is claimed is:

1. A two-stage servovalve comprising:
a motor having a stator and a rotor having a rotor null position and configured and arranged to rotate about a motor axis under the effect of a magnetic field generated by said stator;
a bias mechanism configured and arranged to bias said rotor to said rotor null position;
a first stage valve having a first valve member movably mounted in a first chamber along a first valve axis, and adapted to be moved from a first null position to a first off-null position along said first valve axis to selectively meter fluid flow from at least one port defined between said first valve member and said first chamber;
a second stage valve in fluid communication with said at least one port of said first stage valve and having a second valve member movably mounted in a second chamber along a second valve axis, and adapted to be moved from a first position to a second position along said second valve axis as a function of movement of said first valve member, to selectively meter the flow of fluid from at least one port between said second valve member and said second chamber;
said first stage valve and said second stage valve configured and arranged such that said second valve member is at a pressure equilibrium and does not move when said first valve member is in said first null position;
a transfer link acting between said first valve member and said second valve member;
an eccentric drive member acting between said rotor and said transfer link and having a first eccentric axis that is off-set a distance from said motor axis and arranged such that selective rotation of said rotor about said motor axis causes said transfer link to move;
said transfer link engaging said first valve member at a first connection;
said transfer link engaging said second valve member at a second connection;
said eccentric drive member and said transfer link coupled at a third connection between said first connection and said second connection;
said transfer link and said eccentric drive member configured and arranged such that selective movement of said rotor from said rotor null position to a second rotor position causes said eccentric drive member and said transfer link to move said first valve member from said first null position to said first off-null position;
movement of said first valve member from said first null position to said first off-null position causes said second valve member to move from said first position to said second position; and
said movement of said second valve member to said second position causes said transfer link to move said first valve member from said first off-null position back to said first null position.

2. The servovalve as set forth in claim 1, wherein said transfer link and said eccentric drive member are rotationally coupled at said third connection.

3. The servovalve as set forth in claim 1, wherein said transfer link is configured and arranged to move said first valve member from said first null position to said first off-null position with selective rotation about said second connection.

4. The servovalve as set forth in claim 1, wherein said transfer link is configured and arranged to move said first valve member from said first off-null position back to said first null position with selective rotation about said third connection.

5. The servovalve as set forth in claim 1, wherein said transfer link is configured and arranged to move said first valve member from said first off-null position back to said first null position with selective rotation about said first eccentric axis.

6. The servovalve as set forth in claim 5, wherein said first eccentric axis is aligned with said third connection.

7. The servovalve as set forth in claim 1, wherein said rotor consists essentially of a magnet.

8. The servovalve as set forth in claim 1, wherein said stator comprises a circular ring-like core and windings about said core orientated in opposite directions around said core.

9. A servovalve as set forth in claim 1, wherein said first chamber and said second chamber each comprise a cylinder and said first valve member and said second valve members each comprise a valve spool.

10. The servovalve as set forth in claim 1, wherein said motor is toroidal.

11. A two-stage servovalve comprising:
a motor having a stator and a rotor having a rotor null position and configured and arranged to rotate about a motor axis under the effect of a magnetic field generated by said stator;
a bias mechanism configured and arranged to bias said rotor to said rotor null position;
a first stage valve having a first valve member movably mounted in a first chamber along a first valve axis, and adapted to be moved from a first null position to a first off-null position along said first valve axis to selectively meter fluid flow from a first port and a second port defined between said first valve member and said first chamber;
a second stage valve in fluid communication with said first port and said second port of said first stage valve and having a second valve member movably mounted in a second chamber along a second valve axis, and adapted to be moved from a first position to a second position along said second valve axis as a function of movement of said first valve member, to selectively meter the flow of fluid from at least one port between said second valve member and said second chamber;
said first stage valve and said second stage valve configured and arranged such that said second valve member is at a pressure equilibrium and does not move when said first valve member is in said first null position;
a transfer link acting between said first valve member and said second valve member;
an eccentric drive member acting between said rotor and said transfer link and having a first eccentric axis that is off-set a distance from said motor axis and arranged such that selective rotation of said rotor about said motor axis causes said transfer link to move;
said transfer link and said eccentric drive member configured and arranged such that selective movement of said rotor from said rotor null position to a second rotor position causes said eccentric drive member and said transfer link to move said first valve member from said first null position to said first off-null position;
movement of said first valve member from said first null position to said first off-null position causes said second valve member to move from said first position to said second position;
said movement of said second valve member to said second position causes said transfer link to move said first valve member from said first off-null position back to said first null position;
said second chamber of said second stage valve comprising a first sub-chamber and a second sub-chamber;
said first port of said first stage valve flow connected to said first sub-chamber of said second stage valve and said second port of said first stage valve flow connected to said second sub-chamber of said second stage valve; and
said second valve member adapted to be moved from said first position to said second position along said second valve axis as a function of a hydraulic pressure differential between said first sub-chamber and said second sub-chamber of said second stage valve.

12. A two-stage servovalve comprising:
a motor having a stator and a rotor having a rotor null position and configured and arranged to rotate about a motor axis under the effect of a magnetic field generated by said stator;
a bias mechanism comprising a torsional spring configured and arranged to bias said rotor to said rotor null position;
a first stage valve having a first valve member movably mounted in a first chamber along a first valve axis, and adapted to be moved from a first null position to a first off-null position along said first valve axis to selectively meter fluid flow from at least one port defined between said first valve member and said first chamber;
a second stage valve in fluid communication with said at least one port of said first stage valve and having a second valve member movably mounted in a second chamber along a second valve axis, and adapted to be moved from a first position to a second position along said second valve axis as a function of movement of said first valve member, to selectively meter the flow of fluid from at least one port between said second valve member and said second chamber;
said first stage valve and said second stage valve configured and arranged such that said second valve member is at a pressure equilibrium and does not move when said first valve member is in said first null position;
a transfer link acting between said first valve member and said second valve member;
an eccentric drive member acting between said rotor and said transfer link and having a first eccentric axis that is off-set a distance from said motor axis and arranged such that selective rotation of said rotor about said motor axis causes said transfer link to move;
said transfer link and said eccentric drive member configured and arranged such that selective movement of said rotor from said rotor null position to a second rotor position causes said eccentric drive member and said transfer link to move said first valve member from said first null position to said first off-null position;
movement of said first valve member from said first null position to said first off-null position causes said second valve member to move from said first position to said second position; and
said movement of said second valve member to said second position causes said transfer link to move said first valve member from said first off-null position back to said first null position.

13. A two-stage servovalve comprising:
a motor having a stator and a rotor having a rotor null position and configured and arranged to rotate about a motor axis under the effect of a magnetic field generated by said stator;
a bias mechanism configured and arranged to bias said rotor to said rotor null position;
a first stage valve having a first valve member movably mounted in a first chamber along a first valve axis, and adapted to be moved from a first null position to a first off-null position along said first valve axis to selectively meter fluid flow from at least one port defined between said first valve member and said first chamber;
a second stage valve in fluid communication with said at least one port of said first stage valve and having a second valve member movably mounted in a second chamber along a second valve axis, and adapted to be moved from a first position to a second position along said second valve axis as a function of movement of said first valve member, to selectively meter the flow of fluid from at least one port between said second valve member and said second chamber;
said first stage valve and said second stage valve configured and arranged such that said second valve member is at a pressure equilibrium and does not move when said first valve member is in said first null position;
a transfer link acting between said first valve member and said second valve member, wherein said first valve member comprises a first slot bounded by substantially-parallel first slot walls and said transfer link comprises a rounded marginal end portion engaging said first slot walls and wherein said second valve member comprises a second slot bounded by substantially-parallel second slot walls and said transfer link comprises a second rounded marginal end portion engaging said second slot walls;

an eccentric drive member acting between said rotor and said transfer link and having a first eccentric axis that is off-set a distance from said motor axis and arranged such that selective rotation of said rotor about said motor axis causes said transfer link to move;

said transfer link and said eccentric drive member configured and arranged such that selective movement of said rotor from said rotor null position to a second rotor position causes said eccentric drive member and said transfer link to move said first valve member from said first null position to said first off-null position;

movement of said first valve member from said first null position to said first off-null position causes said second valve member to move from said first position to said second position; and said movement of said second valve member to said second position causes said transfer link to move said first valve member from said first off-null position back to said first null position.

14. A two-stage servovalve comprising:

a motor having a stator and a rotor having a rotor null position and configured and arranged to rotate about a motor axis under the effect of a magnetic field generated by said stator;

a bias mechanism configured and arranged to bias said rotor to said rotor null position;

a first stage valve having a first valve member movably mounted in a first chamber along a first valve axis, and adapted to be moved from a first null position to a first off-null position along said first valve axis to selectively meter fluid flow from at least one port defined between said first valve member and said first chamber;

a second stage valve in fluid communication with said at least one port of said first stage valve and having a second valve member movably mounted in a second chamber along a second valve axis, and adapted to be moved from a first position to a second position along said second valve axis as a function of movement of said first valve member, to selectively meter the flow of fluid from at least one port between said second valve member and said second chamber;

said first stage valve and said second stage valve configured and arranged such that said second valve member is at a pressure equilibrium and does not move when said first valve member is in said first null position;

a transfer link acting between said first valve member and said second valve member;

an eccentric drive member acting between said rotor and said transfer link and having a first eccentric axis that is off-set a distance from said motor axis and arranged such that selective rotation of said rotor about said motor axis causes said transfer link to move;

said transfer link and said eccentric drive member configured and arranged such that selective movement of said rotor from said rotor null position to a second rotor position causes said eccentric drive member and said transfer link to move said first valve member from said first null position to said first off-null position;

movement of said first valve member from said first null position to said first off-null position causes said second valve member to move from said first position to said second position;

said movement of said second valve member to said second position causes said transfer link to move said first valve member from said first off-null position back to said first null position; and at least one bearing acting between said eccentric drive member and said transfer link.

* * * * *